(12) United States Patent
Liao

(10) Patent No.: US 6,273,273 B1
(45) Date of Patent: Aug. 14, 2001

(54) COMPUTER ENCLOSURE INCORPORATING A PIVOTABLE DRIVE BRACKET

(75) Inventor: Nien Chiang Liao, Lu-Chou (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/505,517

(22) Filed: Feb. 17, 2000

(51) Int. Cl.[7] .................................................. A47F 7/00
(52) U.S. Cl. ................................................................ 211/26
(58) Field of Search ........................ 211/26, 189, 190, 211/150; 361/725; 312/258

(56) References Cited

U.S. PATENT DOCUMENTS 5,584,396 * 12/1996 Schmitt ..................................... 211/26
5,890,602 * 4/1999 Schmitt ..................................... 211/26
6,123,203 * 9/2000 Gibbons .................................. 211/26

* cited by examiner

Primary Examiner—Alvin Chin-Shue
Assistant Examiner—Sarah Purol
(74) Attorney, Agent, or Firm—Wei Te Chung

(57) ABSTRACT

A computer enclosure comprises a cage and a drive bracket attached to the cage and pivotable about the cage between a fixing position and an assembling position. The drive bracket has a latch pivotably attached thereto. When the drive bracket is pivoted to the assembling position, the latch is engagable with the cage for securely positioning the drive bracket at the assembling position.

11 Claims, 6 Drawing Sheets

COMPUTER ENCLOSURE INCORPORATING A PIVOTABLE DRIVE BRACKET

BACKGROUND

1. Field of the Invention

The present invention relates a computer enclosure incorporating a pivotable drive bracket, and particularly to a computer enclosure having a means for positioning the pivotable drive bracket.

2. The Related Art

As a development trend of miniaturization of the computer industry, a computer is required to make full use of internal space thereof. Since components of the computer are compactly arranged in a computer enclosure, the assembling thereof is complicated and low efficient. Thus, an accessible configuration of the computer enclosure is desired to facilitate attaching components thereto or thereabout.

A computer necessarily has several data storage devices such as a hard disk drive, a floppy disk drive and a CD-ROM drive for reading, writing or storing data. So a computer enclosure is produced with corresponding drive brackets for mounting the data storage devices thereon. Conventionally, there is relatively wide space under the drive brackets in the computer enclosure for accommodating other components. To install other components under the drive brackets is difficult because the drive brackets are not readily removed after they are assembled. In other words, the existing of the drive brackets usually makes it difficult to install other components thereunder. Examples being disclosed in Taiwan patent application Nos. 81210924 and 83202773, the drive brackets are securely attached to the computer enclosures and hard to be detached from the computer enclosures. Thus, it is inconvenient to attach a data storage device to the drive bracket and assemble other components under the drive bracket.

To counter the above problem, a drive bracket attached to the computer enclosure is pivotable about the computer enclosure from a fixing position to an assembling position, such as those disclosed in Taiwan patent application Nos. 85209373 and 85212166. When the drive bracket is pivoted to the assembling position, a data storage device is easily attached to the drive bracket and other components are easily assembled under the drive bracket. In the former patent, the drive bracket is fixed to the computer enclosure by bolts and is time-consuming to be released to pivot from the fixing position to the assembling position, which still complicates to assemble the data storage device and other components to the computer enclosure. Thus, the drive bracket is required to be readily attached to the computer enclosure and easily released to be pivoted from the fixing position to the assembling position.

Additionally, the pivotable drive bracket is not designed to be securable at the assembling position. When another component or the data storage device is being assembled under or to the drive bracket, the drive bracket should be fixed at the assembling position by hand, which complicates the assembling. Thus, a positioning means is desired to position the drive bracket temporarily at the assembling position during installation of the data storage device or other components.

SUMMARY OF THE INVENTION

Accordingly, an object of the present invention is to provide a computer enclosure incorporating a pivotable drive bracket which is readily attached to the computer enclosure and easily released to be pivoted from a fixing position to an assembling position for facilitating assembling of a data storage device or other components to or under the drive bracket.

Another object of the present invention is to provide a computer enclosure incorporating a pivotable drive bracket which has a latch for positioning the drive bracket at an assembling position.

To achieve the mentioned objects, a computer enclosure of the present invention comprises a cage and a drive bracket attached to the cage and pivotable about the cage between a fixing position and an assembling position. The drive bracket has a latch pivotably attached thereto. When the drive bracket is pivoted to the assembling position, the latch is engagable with the cage for securely positioning the drive bracket at the assembling position.

Other objects, advantages and novel features of the present invention will be drawn from the following detailed embodiment of the present invention with attached drawings, in which:

DESCRIPTION OF THE PREFERRED EMBODIMENT

Figure 1:
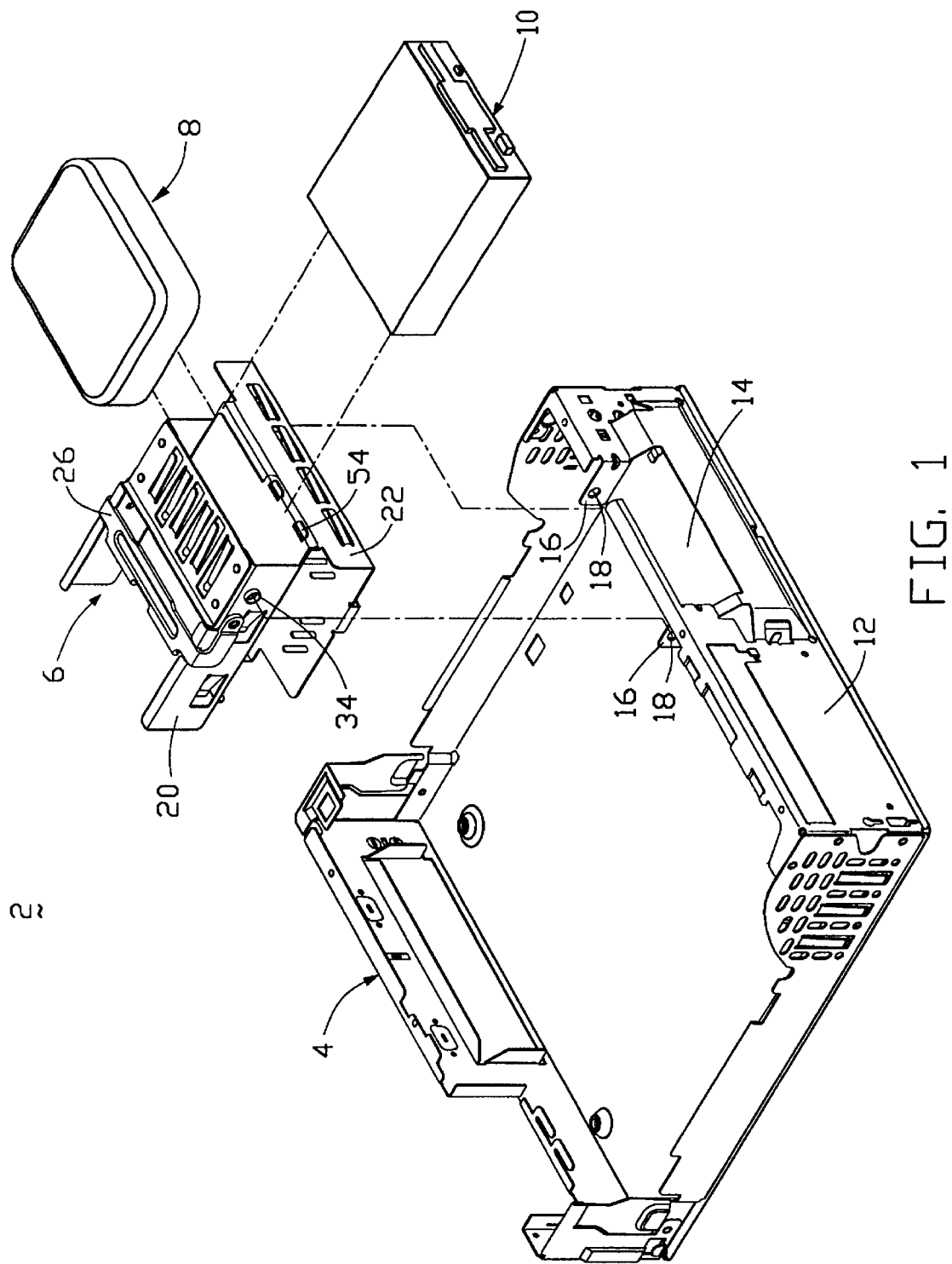
FIG. 1 is an exploded view of a computer enclosure embodying the concepts of the present invention with a hard disk drive and a floppy disk drive to be attached thereto.
Figure 2:
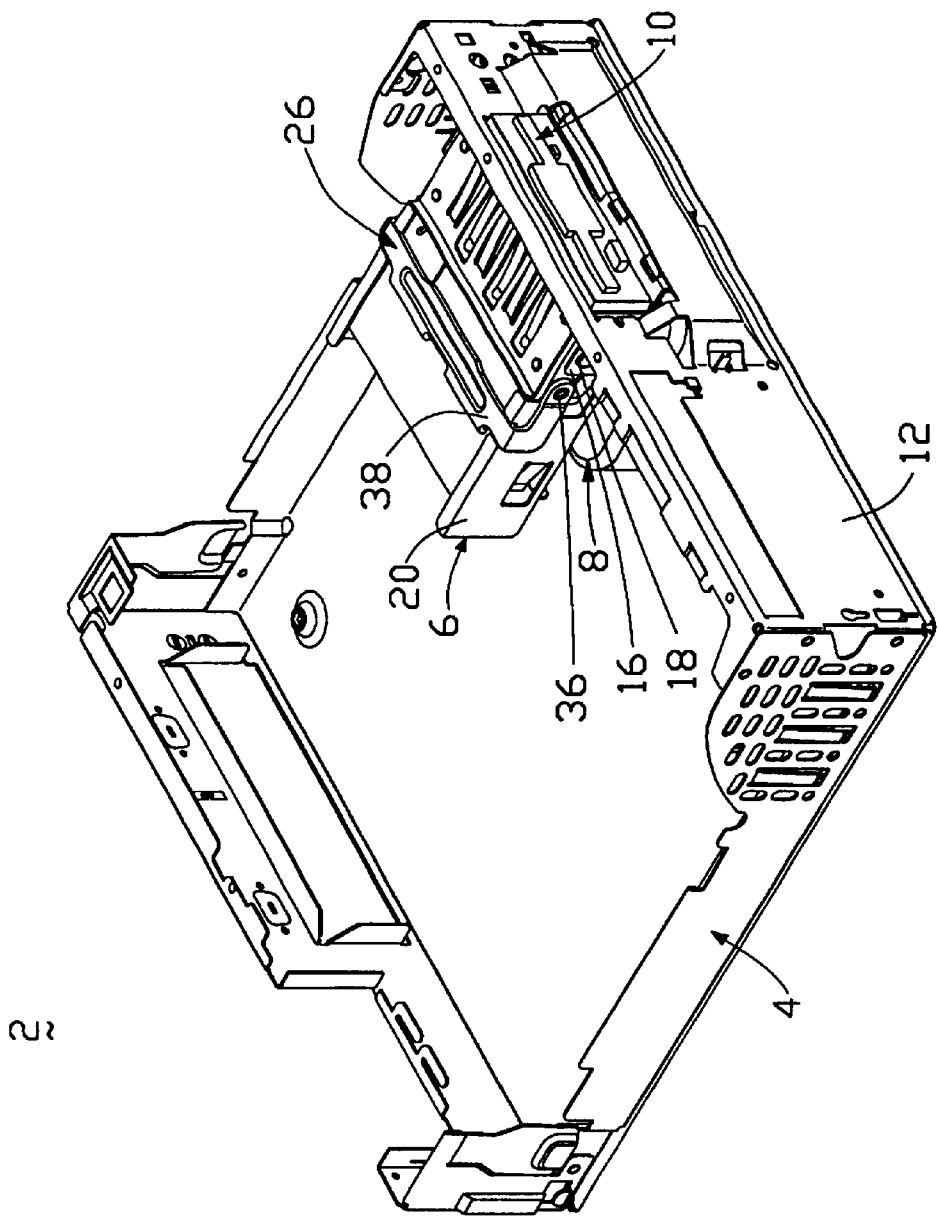
FIG. 2 is an assembled view of FIG. 1.

Referring to FIGS. 1 and 2, a computer enclosure 2 of the present invention includes a cage 4 and a drive bracket 6 attached to the cage 4 for receiving a data storage device. In the embodiment, a hard disk 8 and a floppy disk drive 10 are respectively received in the drive bracket 6. The cage 4 includes a front panel 12 defining an opening 14 for providing access to the floppy disk drive 10. A pair of tabs 16 inwardly extends from opposite edges of the opening 14 and each defines a pivoting hole 18 therein. It should be noted that an upper edge portion adjacent the opening 14 is omitted in FIG. 1 for illustration of the tab 16.

Figure 3:
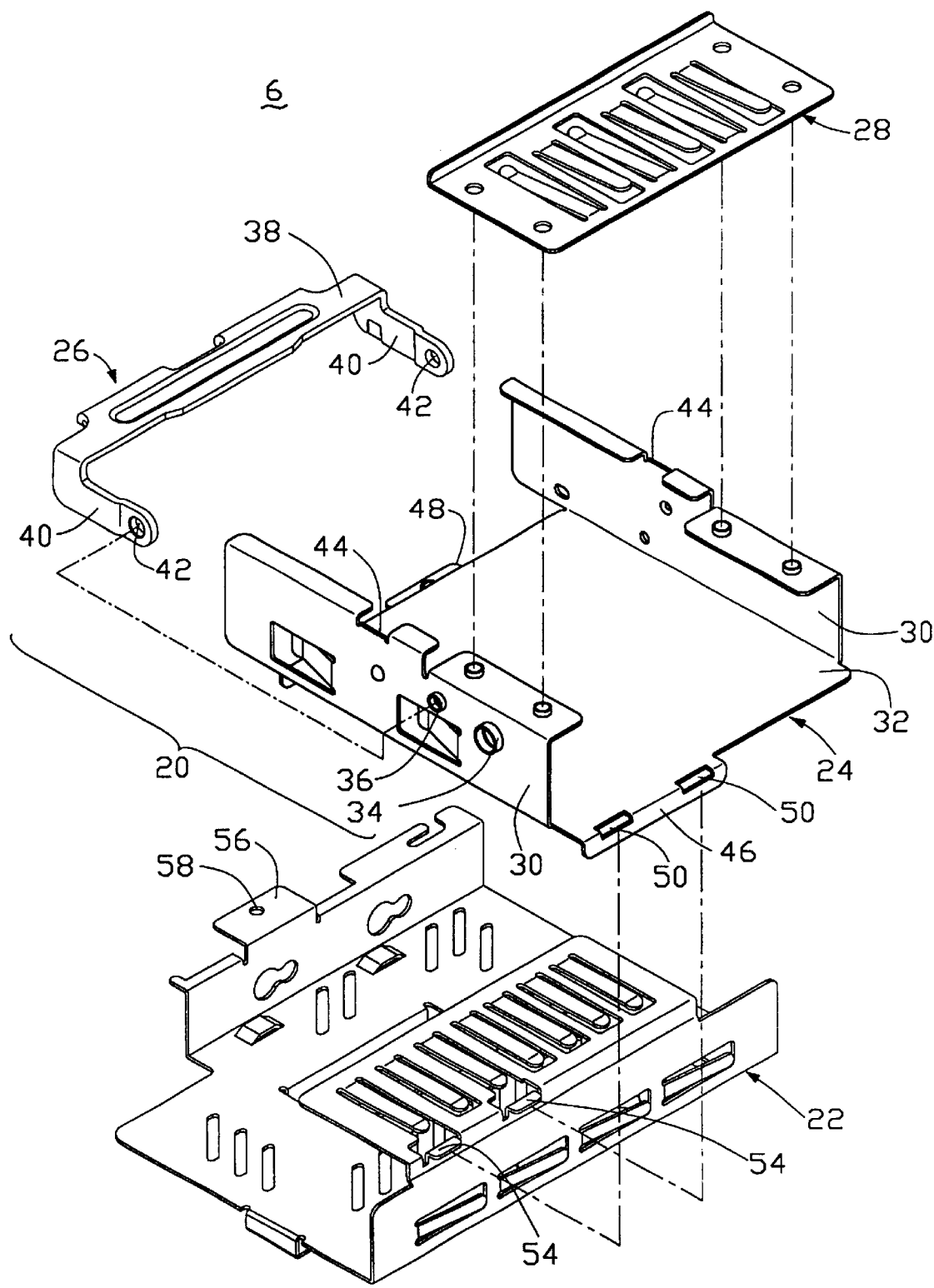
FIG. 3 is an exploded view of a drive bracket of FIG. 1.
Figure 4:
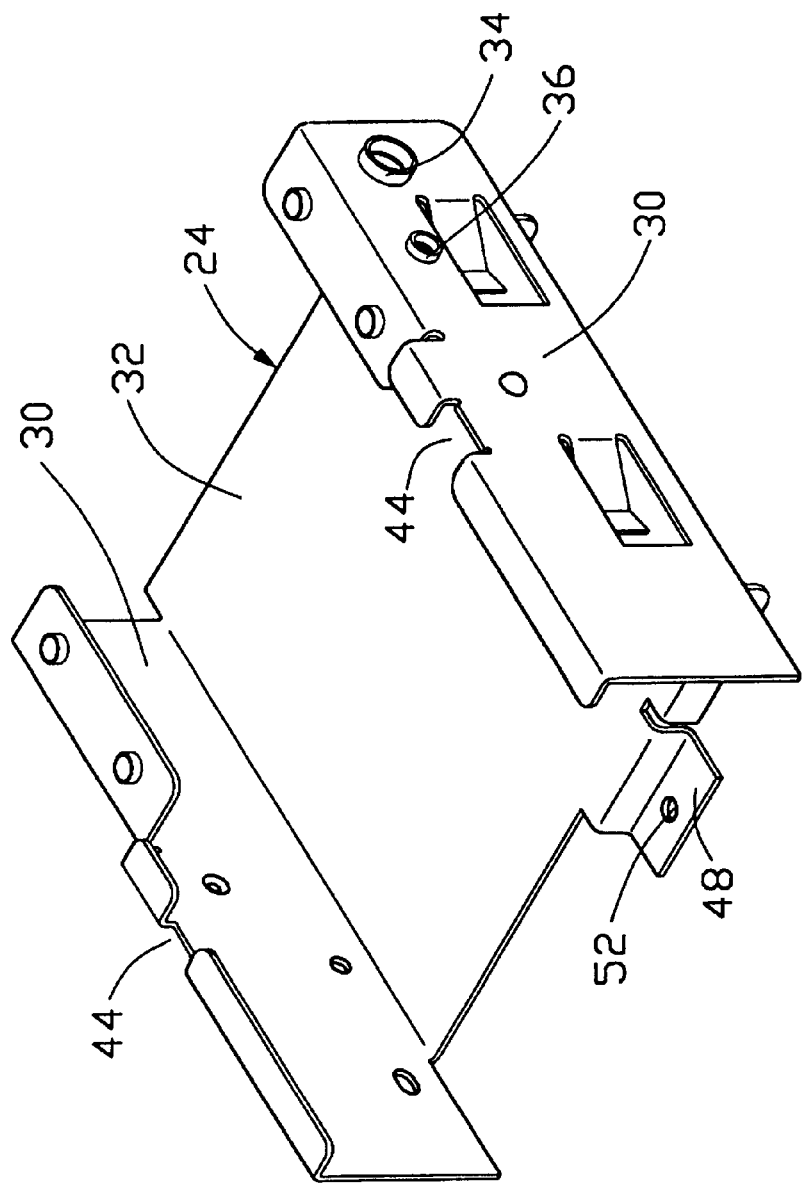
FIG. 4 is a perspective view of a top carrier of FIG. 3.

Referring to FIGS. 1, 3 and 4, the drive bracket 6 includes a first carrier 20 for receiving the floppy disk drive 10, and a second carrier 22 lowly attached to the first carrier 20 for receiving the hard disk drive 8. The first carrier 20 includes a U-shaped base 24 and a latch 26 pivotably attached to the U-shaped base 24. A grounding plate 28 is attached to the U-shaped base 24 for resiliently contacting the floppy disk drive 10 to form grounding paths. The U-shaped base 24 includes a pair of side walls 30 and a bottom wall 32 connected between the side walls 30. A pair of first protrusions 34 and a pair of second protrusions 36 respectively extends from outer surfaces of the side walls 30, wherein the first protrusions 34 pivotably extend through the pivoting holes 18 of the tabs 16 of the cage 4. The latch 26 includes an elongate U-shaped body 38 and a pair of arms 40 extending from distal ends of the body 38. Each arm 40 defines a pivoting aperture 42 for receiving the second protrusions 36 of the U-shaped base 24. A pair of cutouts 44 is defined in the top edges of the side walls 30 of the U-shaped base 24 for positioning the body 38 of the latch 26.

A flange 46 and a right-angled tab 48 respectively extend from opposite edges of the bottom wall 32 of the U-shaped base 24. The flange 46 defines a pair of slots 50. The right-angled tab 48 defines a fixing hole 52 therein. The second carrier 22 includes a pair of fixing tabs 54 for engagingly extending through the slots 50 of the first carrier 20 and a supporting tab 56 opposite the fixing tabs 54 for supporting the right-angled tab 48 of the first carrier 20. The supporting tab 56 defines a screw hole 58 for threadedly engaging with a bolt (not shown) extending through the fixing hole 52 of the first carrier 20. Thus, the second carrier 22 is securely attached to the first carrier 20 by engaging the fixing tabs 54 of the second carrier 22 with the slots to 50 of the first carrier 20 and by extending the bolt through the fixing hole 52 and threadedly engaging with the screw hole 58 of the second carrier 22.

Referring to FIGS. 1–3, in assembling, the drive bracket 6 is pivotably attached to the front panel 12 of the cage 4 at a fixing position with the first protrusions 34 thereof pivotably extending through the pivoting holes 18 of the tabs 16 of the cage 4. The latch 26 of the drive bracket 6 is pivotably attached to the first carrier 20 with the second protrusions 36 of the first carrier 20 pivotably extending through the pivoting apertures 42 of the latch 26.

Figure 5:
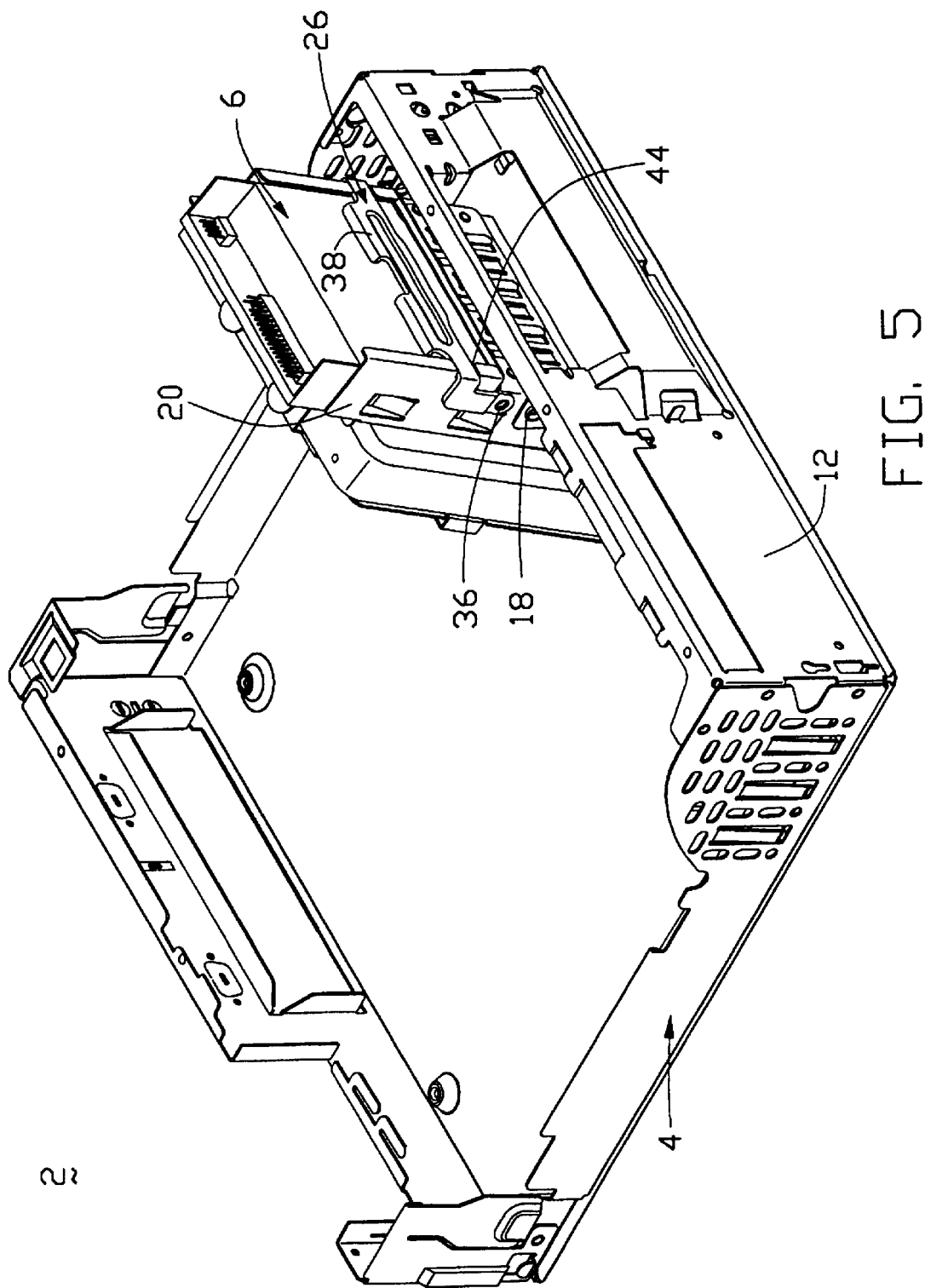
FIG. 5 is similar to FIG. 2 showing the drive bracket pivoted to an assembling position associated to the computer enclosure.
Figure 6:
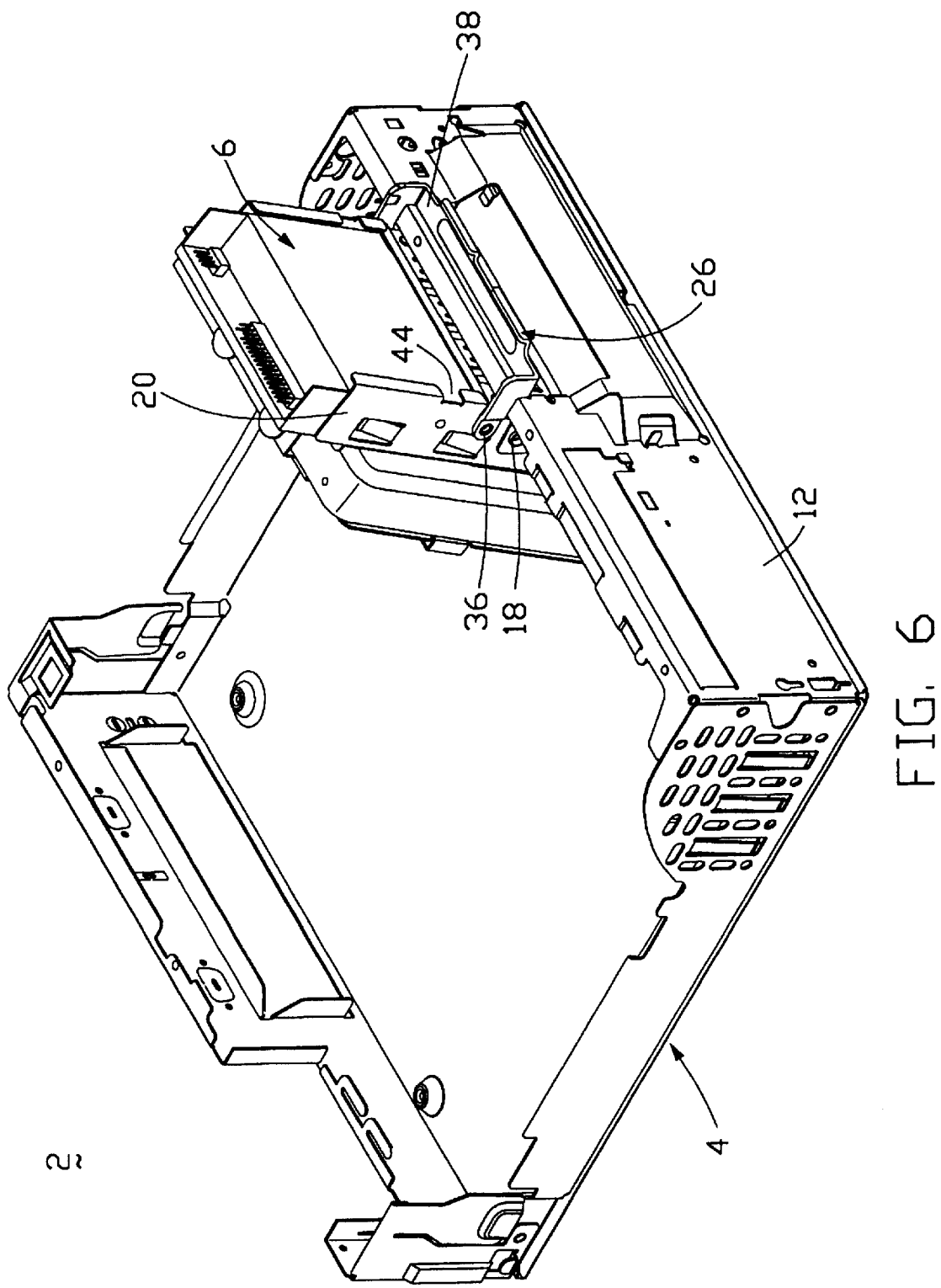
FIG. 6 is similar to FIG. 2 showing the drive bracket positioned at the assembling position associated to the computer enclosure.

Referring to FIGS. 2, 5 and 6, when the drive bracket 6 is required to pivot about the pivoting holes 18 of the cage 4 from the fixing position to an assembling position for access of other components thereto or thereunder, a rear portion of the drive bracket 6 is firstly pulled up for rendering the drive bracket 6 from a horizontal position (fixing position) to a vertical position (assembling position) and then the latch 26 is pivoted about the second protrusions 36 of the first carrier 20 from its unlocking position to its locking position with substantially a right angle, causing the body 38 to detach from the cutouts 44 of the first carrier 20 and finally to engage with the front panel 12 of the cage 4. Thus, the pivotable drive bracket 6 is positioned at the assembling position for facilitating assembling components thereto or thereunder.

The above description is just an embodiment to illustrate the present invention, but not to limit the scope of the present invention. The obvious changes according to the present invention should be covered in the scope of the present invention.

What is claimed is:

1. A computer enclosure comprising:
   a cage; and
   a drive bracket attached to the cage and pivotable about the cage between a fixing position and an assembling position, the drive bracket having a latch pivotably attached thereto, wherein when the drive bracket is pivoted to the assembling position, the latch is engagable with the cage for securely positioning the drive bracket at the assembling position.

2. The computer enclosure as described in claim 1, wherein the cage forms a pair of tabs each defining a pivoting hole, and wherein the drive bracket forms a pair of first protrusions for pivotably extending through the pivoting holes of the tabs.

3. The computer enclosure as described in claim 1, wherein the latch defines a pair of pivoting apertures, and wherein the drive bracket forms a pair of second protrusions for pivotably extending through the pivoting apertures of the latch.

4. The computer enclosure as described in claim 1, wherein the latch includes a pair of arms for pivotably attached to the drive bracket and a body connected between the arms for engaging with the cage.

5. The computer enclosure as described in claim 4, wherein the body of the latch is U-shaped.

6. The computer enclosure as described in claim 4, wherein the drive bracket defines a pair of cutouts for extension of the body of the latch.

7. A computer enclosure comprising:
   a cage; and
   a drive bracket attached to the cage and pivotable about the cage between a fixing position and an assembling position, the drive bracket having a latch thereon, wherein when the drive bracket is pivoted to the assembling position, the latch is engagable with the cage for securely positioning the drive bracket at the assembling position.

8. The computer enclosure as described in claim 7, wherein the cage forms a pair of tabs each defining a pivoting hole, and wherein the drive bracket forms a pair of first protrusions for pivotably extending through the pivoting holes of the tabs.

9. The computer enclosure as described in claim 7, wherein the drive bracket includes first and second carriers adapted for respectively receiving a data storage device.

10. The computer enclosure as described in claim 9, wherein the first and second carriers are stacked together, and wherein the latch is attached to the first carrier.

11. A computer enclosure comprising:
    a cage defining a front panel;
    a drive bracket pivotably attached to the front panel and defining a horizontal fixing position and a vertical assembling position; and
    a moveable latch disposed on one of the drive bracket and the front panel;
    wherein
    when the drive bracket is pivoted to the assembling position, the latch is moved from an unlocking position to a locking position and retainably holds the drive bracket in the assembling position.

* * * * *